(12) United States Patent
Yoneda

(10) Patent No.: US 9,786,317 B2
(45) Date of Patent: Oct. 10, 2017

(54) RECORDING APPARATUS AND METHOD OF CONTROLLING RECORDING APPARATUS

(71) Applicant: CANON KABUSHIKI KAISHA, Tokyo (JP)

(72) Inventor: Shigeru Yoneda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/079,494

(22) Filed: Mar. 24, 2016

(65) Prior Publication Data

US 2016/0286192 A1 Sep. 29, 2016

(30) Foreign Application Priority Data

Mar. 27, 2015 (JP) .................................. 2015-066816

(51) Int. Cl.
*H04N 5/76* (2006.01)
*G11B 20/10* (2006.01)
(Continued)

(52) U.S. Cl.
CPC ........ *G11B 20/10527* (2013.01); *G11B 19/04* (2013.01); *G11B 20/10* (2013.01);
(Continued)

(58) Field of Classification Search
USPC ....................................................... 386/294
See application file for complete search history.

(56) References Cited

U.S. PATENT DOCUMENTS 6,208,754 B1 * 3/2001 Abe ........................ G06T 9/007
382/166
2003/0058352 A1 * 3/2003 Nishijima .............. G11B 20/10
348/231.1

(Continued)

FOREIGN PATENT DOCUMENTS

JP 2007-235570 A 9/2007
JP 2010-183247 A 8/2010

OTHER PUBLICATIONS

British Search Report dated Sep. 1, 2016, that issued in the corresponding U.K. Patent Application No. GB1605048.6.

*Primary Examiner* — William C Vaughn, Jr.
*Assistant Examiner* — Daniel Tekle
(74) *Attorney, Agent, or Firm* — Cowan, Liebowitz & Latman, P.C.

(57) ABSTRACT

A recording apparatus including: a recording unit configured to record on a recording medium a file that includes sequentially obtained data; a repair unit configured to repair a predetermined file that needs to be repaired out of files recorded on the recording medium; and a control unit configured to control the recording unit so that recording of data is stopped in response to a drop of a free capacity of the recording medium to a predetermined capacity during recording of the data, the control unit being configured to determine the predetermined capacity based on a data amount necessary to repair the predetermined file that is recorded on the recording medium, to thereby control the recording unit so that the recording of the data is stopped in response to a drop of the free capacity of the recording medium to the predetermined capacity during the recording of the data.

11 Claims, 6 Drawing Sheets

(51) Int. Cl.
*G11B 20/18* (2006.01)
*G11B 27/034* (2006.01)
*G11B 27/10* (2006.01)
*G11B 27/30* (2006.01)
*G11B 27/32* (2006.01)
*G11B 27/34* (2006.01)
*G11B 19/04* (2006.01)
*H04N 21/4335* (2011.01)
*H04N 21/433* (2011.01)

(52) U.S. Cl.
CPC ............ *G11B 20/18* (2013.01); *G11B 27/034* (2013.01); *G11B 27/105* (2013.01); *G11B 27/30* (2013.01); *G11B 27/329* (2013.01); *G11B 27/34* (2013.01); *H04N 5/76* (2013.01); *H04N 21/4334* (2013.01); *H04N 21/4335* (2013.01); *G11B 2020/10537* (2013.01)

(56) References Cited

U.S. PATENT DOCUMENTS

2011/0058794 A1\* 3/2011 Nishigaki ........ G11B 20/00007
386/328
2014/0372798 A1 12/2014 Chang \* cited by examiner

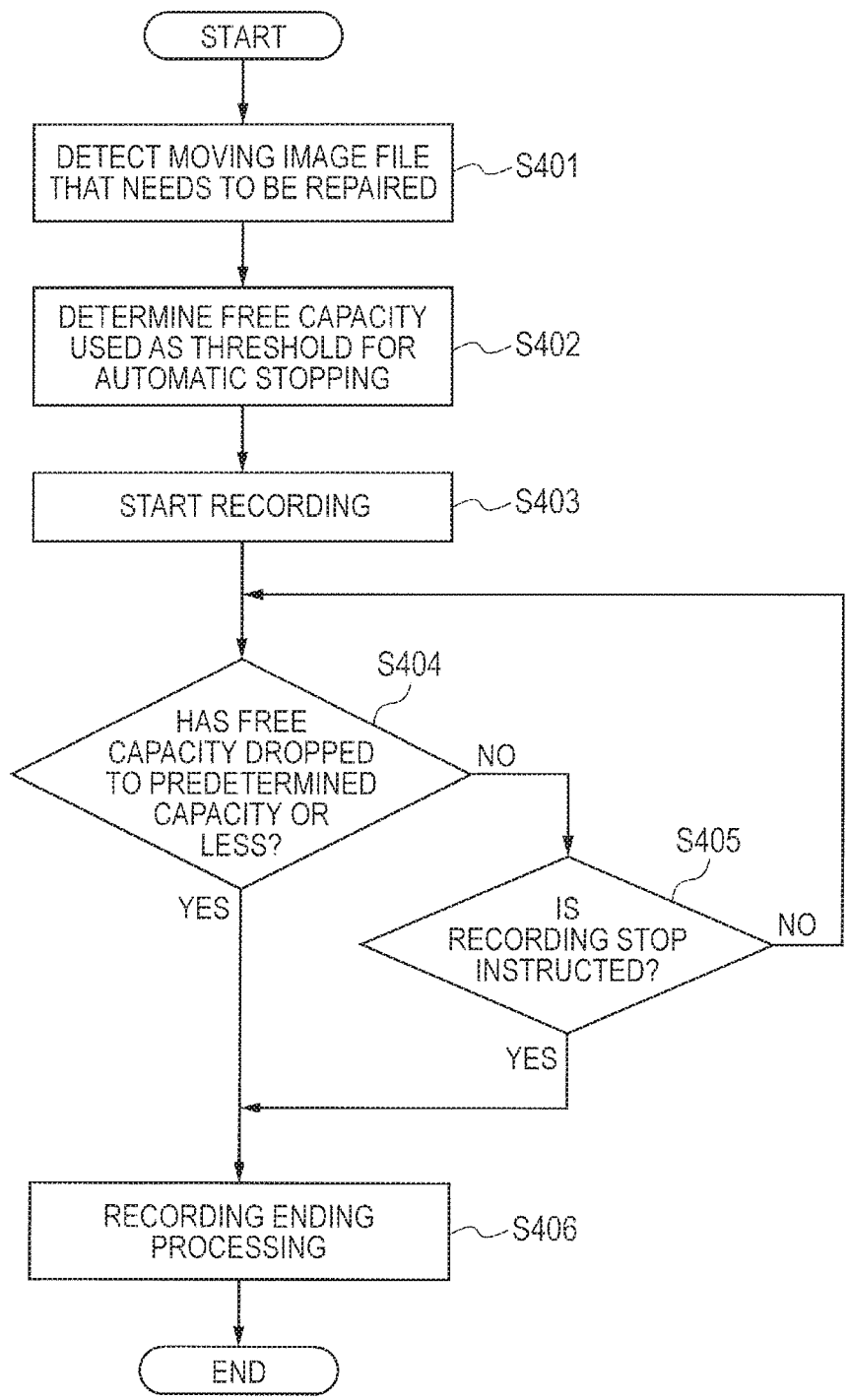

RECORDING APPARATUS AND METHOD OF CONTROLLING RECORDING APPARATUS

BACKGROUND OF THE INVENTION

Field of the Invention

The present disclosure relates to a recording apparatus and a method of controlling a recording apparatus.

Description of the Related Art

Material Exchange Format (MXF) has hitherto been known as a format for recording moving image data on a recording medium. An apparatus for recording data in the MXF format has also been proposed (see Japanese Patent Application Laid-Open No. 2007-235570).

In addition to moving image data, offset information for random access to the moving image data is recorded in the MXF format. MXF files need to be repaired in the case where recording by a recording apparatus such as a video camera is interrupted momentarily for reasons such as the detachment of the battery during recording.

Repairing a file requires a long time. A recording apparatus designed so as to simply proceed to repair processing when a file that needs to be repaired is generated cannot shoot a scene for the duration of the processing of repairing the file.

SUMMARY OF THE INVENTION

According to one aspect of an embodiment, there is provided a recording apparatus including: a recording unit configured to record on a recording medium a file that includes sequentially obtained data; a repair unit configured to execute repair processing for repairing a predetermined file that needs to be repaired out of files recorded on the recording medium; and a control unit configured to control the recording unit so that recording of data is stopped in response to a drop of a free capacity of the recording medium to a predetermined capacity during recording of the data, the control unit being configured to determine the predetermined capacity based on a data amount necessary to repair the predetermined file that is recorded on the recording medium, to thereby control the recording unit so that the recording of the data is stopped in response to a drop of the free capacity of the recording medium to the predetermined capacity during the recording of the data.

According to another aspect of an embodiment, there is provided a method of controlling a recording apparatus, including: determining a predetermined capacity based on a data amount necessary to repair a file that needs to be repaired, when there is the file that needs to be repaired among files recorded on a recording medium; sequentially recording data on the recording medium; and stopping recording of the data in response to a drop of a free capacity of the recording medium to the predetermined capacity during the recording of the data.

Further features of the present invention will become apparent from the following description of exemplary embodiments with reference to the attached drawings.

BRIEF DESCRIPTION OF THE DRAWINGS

FIG. 4 is a flow chart for illustrating moving image recording processing that is executed in the recording apparatus according to the embodiment.

FIGS. 5A, 5B, 5C and 5D are diagrams for illustrating recording ending processing that is executed in the recording apparatus according to the embodiment.

DESCRIPTION OF THE EMBODIMENTS

An embodiment of the present invention is described below in detail with reference to the drawings. However, the present invention is not limited to the following embodiment. The following embodiment is not to limit the invention laid down in the scope of claims, and not all of combinations of features described in the following embodiment are indispensable to the solving means of the present invention.

Function blocks described in the following embodiment do not always need to be separate pieces of hardware. For instance, the functions of several function blocks may be implemented by a single piece of hardware. Alternatively, several pieces of hardware may cooperate with one another to implement the function of a single function block or to implement the functions of a plurality of function blocks. The functions of the function blocks may also be implemented by computer programs deployed by a CPU onto a memory.

The description of this embodiment takes as an example a case where a recording apparatus of the present invention is applied to an image pickup apparatus. However, the recording apparatus of the present invention is not limited to an image pickup apparatus, and can be a cellular phone, a smartphone, tablet information terminal, a notebook information terminal, a computer, or the like.

[One Embodiment]

A recording apparatus, a method of controlling the recording apparatus, and a computer program according to an embodiment are described with reference to FIG. 1 to FIG. 7.

Figure 1:
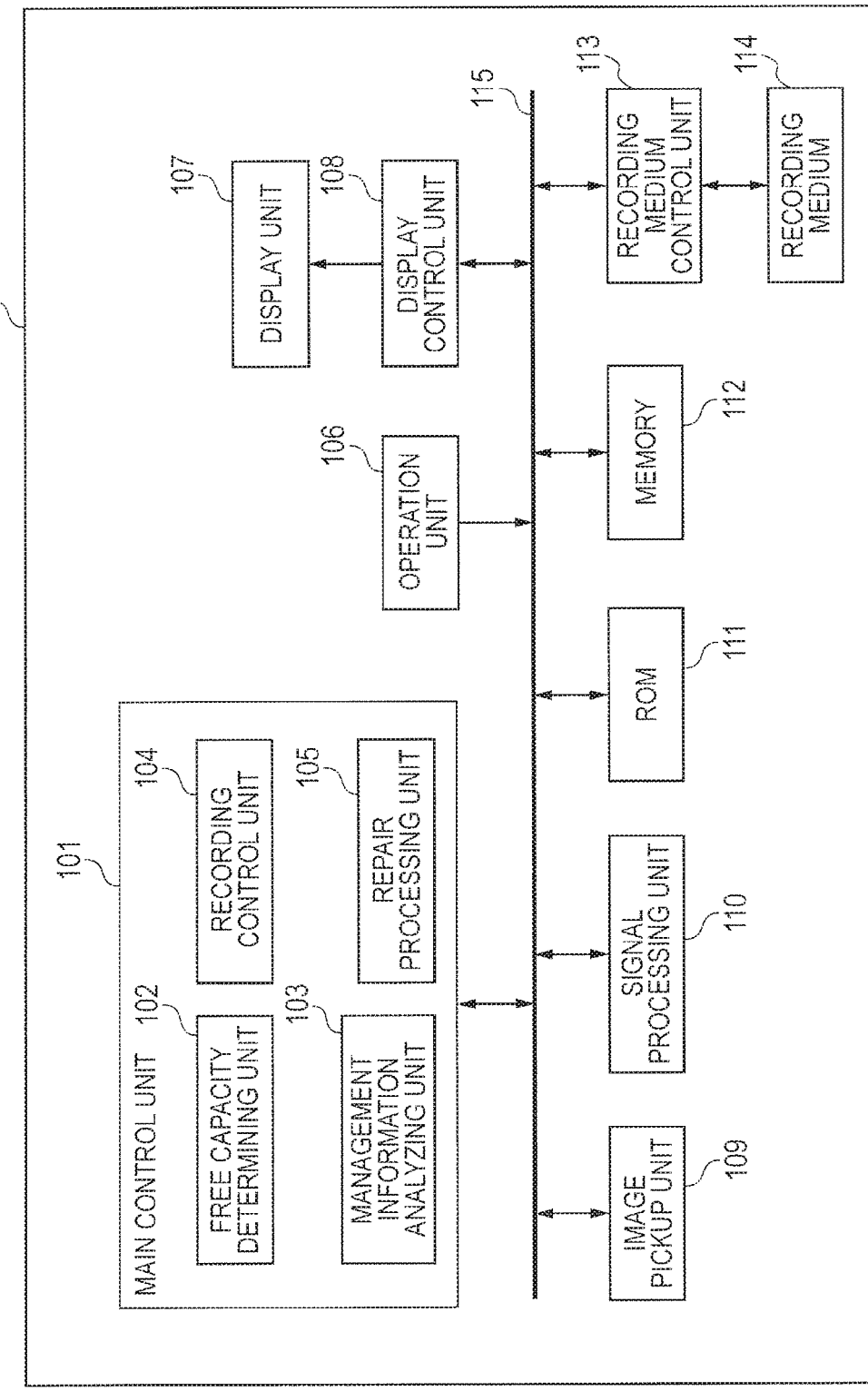
FIG. 1 is a block diagram for illustrating the configuration of a recording apparatus according to an embodiment.

The configuration of a recording apparatus 100 according to the present embodiment is described first with reference to FIG. 1. FIG. 1 is a block diagram for illustrating the configuration of the recording apparatus according to the present embodiment.

The recording apparatus 100 records moving image data in the MXF format. A main control unit 101 includes a CPU, a memory, and others to handle the overall control of the recording apparatus 100. The main control unit 101 controls components of the recording apparatus 100 as dictated by a program stored in ROM 111, information stored in a memory 112, information from an operation unit 106, and the like. The main control unit 101 includes, as function blocks, a free capacity determining unit 102, a management information analyzing unit 103, recording control unit 104, and a repair processing unit 105.

The operation unit 106 is, for example, a collection of switches and the like that are operated to input various instructions, such as a power button, a button to instruct the start/stop of recording, a menu display button, a mode switching switch, and an enter button. A user operates these switches or buttons, thereby causing the operation unit 106 to transmit an operation signal to the main control unit 101. The operation unit 106 can also be an operation piece of any type, such as cursor keys, pointing devices, touch panels, and dials. Operation members of the operation unit 106 may instead be implemented as various function icons displayed on a display unit 107. The user can select or operate these function icons.

The display unit 107 includes, for example, a liquid crystal display device or an organic EL display device, and displays an image, a menu screen, and other necessary pieces of information under control of a display control unit 108. In recording, the display control unit 108 displays a moving image captured by an image pickup unit 109 and various types of information on the display unit 107. In reproducing, the display control unit 108 displays a reproduced moving image on the display unit 107.

The image pickup unit (obtaining unit) 109 photographs an object and outputs moving image data.

In recording, a signal processing unit 110 performs predetermined image processing, compression coding processing, and the like on moving image data obtained by the image pickup unit 109. In reproducing, the signal processing unit 110 decodes a reproduced moving image data and outputs the decoded moving image data.

The ROM 111 stores non-volatile information such as a program of the main control unit 101 and fixed values.

The memory 112 includes a volatile memory such as a DRAM, and stores, among others, moving image data to be recorded, management information, and various types of information necessary for control by the main control unit 101.

A recording medium control unit 113 records data such as moving image data and management information on a recording medium 114, and reads data out of the recording medium 114, following an instruction from the main control unit 101.

The recording medium 114 can be accessed by random access. The recording medium 114 includes a flash memory, a storage apparatus with a built-in controller, or the like. A removable recording medium or a built-in recording medium can also be used as the recording medium 114.

A data bus 115 transfers data and commands between components of the recording apparatus 100.

The main control unit 101 has a file system (not shown) such as the File Allocation Table (FAT) to manage, as files, moving image data and management information that are recorded on the recording medium 114. The main control unit 101 reads file system information out of the recording medium 114 and stores the read information in the memory 112. The main control unit 101 updates file system information recorded on the recording medium 114 by writing in the recording medium 114 file system information in accordance with recording processing or erasure processing.

The free capacity determining unit 102 of the main control unit 101 determines the capacity of an area of the recording medium 114 that is not used by the recording apparatus 100 at present, in short, the capacity of an unused area. Specifically, the free capacity determining unit 102 regularly calculates the sum of free areas by detecting free areas in which a moving image can be written from file system information of the file system such as the FAT. The processing of detecting and calculating free areas may be executed at the time when the FAT is updated due to a write or a removal.

The management information analyzing unit 103 of the main control unit 101 reads a management information file, which is regulated by MXF standards, out of the recording medium 114 when the recording medium 114 is recognized, analyzes the information and number of MXF files, and keeps the analysis.

The recording control unit 104 of the main control unit 101 controls the writing and reading of moving image data and management information in the recording medium 114. Specifically, the recording control unit 104 controls the generation of management information, the writing of moving image data that is being recorded, an update of management information, processing that is executed when the recording of moving image data is to be stopped, and the like.

The repair processing unit 105 of the main control unit 101 executes processing of repairing a moving image file in a manner described later, when an instruction to repair a moving image file that needs to be repaired and that is recorded on the recording medium 114 is issued.

The MXF format is described next. The MXF format is a format in which moving image data is paired with an index table for random access to the moving image data to store the moving image data and the index table in a single file. An index table in the MXF format indicates a boundary between frames of moving image data. The use of an index table allows for frame-by-frame random access to moving image data. MXF is a file format defined by the Society of Motion Pictures and Television Engineers (SMPTE). Such as SMPTE ST 381-3 define a mapping structure for an MPEG stream, which is a typical compression coding format of moving image data. In conformity with MXF standards such as SMPTE ST 381-3, an MXF file structured so that moving image data and voice data are interleaved by frame interleaving is referred to as interleave MXF file.

Figure 2A:
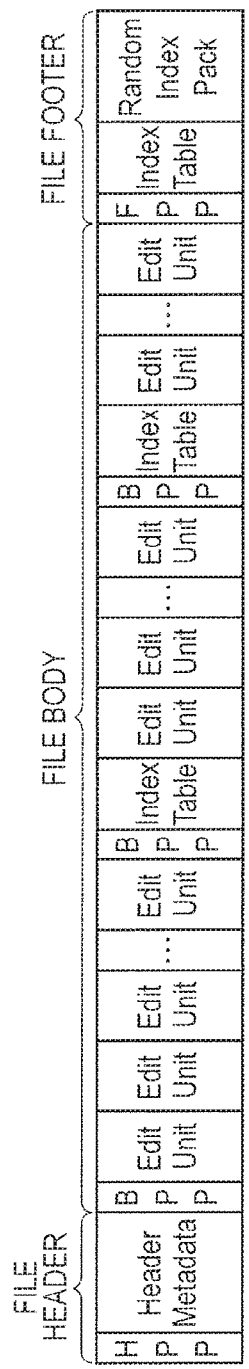
FIGS. 2A and 2B are diagrams for illustrating examples of the file structure of an interleave MXF file.
Figure 2B:
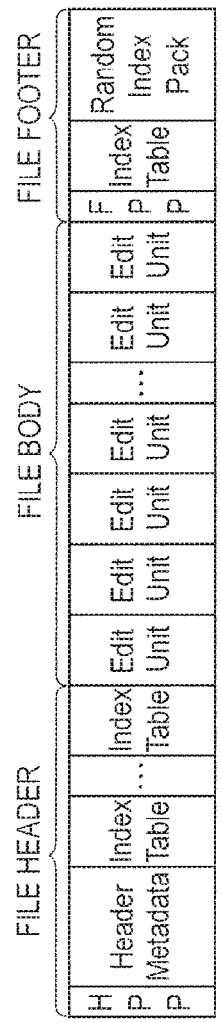

FIG. 2A and FIG. 2B are diagrams for illustrating examples of the file structure of an interleave MXF file. Illustrated in FIG. 2A is an example of the file structure of an interleave MXF file. The interleave MXF file illustrated in FIG. 2A is made up of a file header (FH), a file body (FB), and a file footer (FF). The file header is made up of a header partition pack (HPP) and header metadata. The file body is made up of body partition packs (BPPs), edit units (EUs), and index tables (ITs). The file footer is made up of a footer partition pack (FPP), an index table (IT), and a random index pack (RIP).

The header partition pack (HPP) is made up of a header identifier, information indicating the format of data that is put in the file body or a file format, a footer partition pack (FPP) storage start offset address, and others. As the header metadata, there is stored file-by-file metadata such as the date of creation of the file.

Each body partition pack (BPP) is made up of a body identifier, the offset address of a partition pack (HPP or BPP) that is put immediately ahead of relevant body partition pack, the storage start offset addresses of relevant BPP and the footer partition pack (FPP), and others. Zero or one index table (IT) and at least one edit unit (EU) are put in each area partitioned by body partition packs (BPPs). Each edit unit (EU) stores frame-by-frame moving image data and voice data. An aggregation of edit units (EUs) in each area partitioned by body partition packs (BPPs) is called an essence container (EC), and houses moving image data and voice data. Each index table (IT) stores offset information of edit units (EUs) contained in an essence container (EC) that is associated with the index table within the associated essence container (EC).

The footer partition pack (FPP) is made up of a footer identifier, the storage start offset of a body partition pack (BPP) that is put immediately ahead of the FPP, the storage start offset of the footer partition pack (FPP), and others. The random index pack (RIP) is made up of a header that indicates the random index pack, the storage start offset address of each partition pack in the interleave MXF file, and the data size of the random index pack. A fill item (NULL data) for boundary adjustment is put immediately behind each of elements that constitute the interleave MXF file (a partition pack (PP), an index table (IT), or the like).

In the case of the file structure illustrated in FIG. 2A, the header partition pack (HPP) and each body partition pack (BPP) need to store the offset information of the footer partition pack (FPP). The offset location of the footer partition pack (FPP) is unknown until after the recording of the moving image file is stopped. The offset information of the footer partition pack (FPP) is therefore written when the recording is stopped to each of body partition packs (BPPs) located at discrete addresses. The recording medium 114, which is a memory card or the like, is slow in discrete writing speed, and writing the offset information of the footer partition pack (FPP) to each of numerous body partition packs (BPPs) accordingly requires a long time.

As a solution, an interleave MXF file that has a file structure illustrated in FIG. 2B has been proposed. FIG. 2B is a diagram for illustrating another example of the file structure of an interleave MXF file. In an interleave MXF file having the file structure illustrated in FIG. 2B, no body partition pack (BPP) is stored in the file body and an index table (IT) is stored in the file header. Edit unit (EU) where moving image data and voice data are stored is stored in the file body. In the MXF file illustrated in FIG. 2B, the offset information of the footer partition pack (FPP) is recorded in one place in the header partition pack (HPP) of the file header. The index tables (ITs) are recorded in the file header in succession.

In the present embodiment, offset information to be stored in index tables (IT) are created during the recording of a moving image and the created offset information is stored in the memory 112 in order to record the index tables (ITs) in successive areas of the recording medium 114. When an instruction to stop recording is issued subsequently, the stored offset information is read out from the memory 112 and recorded as index tables (ITs) on the recording medium 114.

The description of the present embodiment takes as an example a case where a moving image is recorded in a file format as the one illustrated in FIG. 2B. However, the present invention is not limited thereto and a moving image may be recorded in a file format as the one illustrated in FIG. 2A.

Recording processing that is executed in the recording apparatus according to the present embodiment is described next.

When the recording apparatus 100 is powered on by operating the operation unit 106, the main control unit 101 controls relevant components to set the recording apparatus 100 to a recording standby state. In the recording standby state, the image pickup unit 109 outputs an obtained moving image data. The display control unit 108 displays on the display unit 107 a moving image that is generated from the moving image data output by the image pickup unit 109, along with other necessary pieces of information. When an instruction to start recording is output from the operation unit 106 in the recording standby state, the main control unit 101 issues the following instruction to the recording medium control unit 113. That is, the main control unit 101 instructs the recording medium control unit 113 to record management information that is associated with a moving image file on the recording medium 114, and to record moving image data output from the signal processing unit 110 on the recording medium 114. In the present embodiment, moving image data is recorded on the recording medium 114 in accordance with the MXF file format. The main control unit 101 also generates system information associated with the moving image data and records the system information on the recording medium 114. The system information includes the value of an offset from the head of the moving image data file, a coding format, and other pieces of information necessary to reproduce the moving image data. Each time unrecorded moving image data is accumulated in the memory 112 in a predetermined amount that is the unit of a single write, the recording medium control unit 113 reads the predetermined amount of moving image data out of the memory 112 and records the read data on the recording medium 114.

The size of index table (IT), which is a type of system information, increases in proportion to the length of the recording time of the moving image. The recording control unit 104 in the present embodiment therefore generates the offset information of each edit unit (EU) contained in moving image data during the recording of a moving image, and stores the generated offset information in the memory 112. When processing for stopping the recording of moving image data is executed following the user's instruction to stop recording, the stored offset information is read out from the memory 112 and index tables containing the offset information are recorded at predetermined locations in the MXF file.

When moving image recording is stopped in response to the user's instruction to stop recording, an index table (IT) containing offset information is recorded on the recording medium 114 as described above. On the other hand, in the case where recording is stopped because power is cut off by taking the battery out during moving image recording or for other reasons, index table (IT) containing offset information that has been stored in the memory 112 is not recorded on the recording medium 114. Such cases require processing of repairing the offset information of the moving image file the recording of which is stopped.

Figure 3:
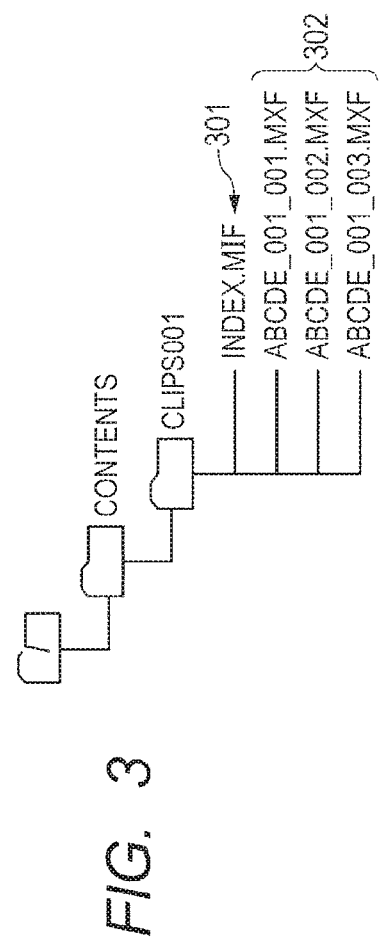
FIG. 3 is a diagram for illustrating an example of files that are recorded in the MXF format.

FIG. 3 is a diagram for illustrating an example of files that are recorded in the MXF format on the recording medium 114. In FIG. 3, a "CONTENTS" directory is created under a root directory. A "CLIPS001" directory is created under the CONTENTS directory. Files 301 and 302 are stored under the CLIPS001 directory.

As illustrated in FIG. 3, in the present embodiment, the management file 301, namely, a media information file (MIF) 301, is recorded on the recording medium 114 in addition to the MXF files 302 containing a moving image data. The management file 301 is a file that contains management information of all files recorded on the recording medium 114. The management information recorded in the MIF includes, for example, the number of total clips, the number of frames of each clip, and the names of the MXF files. The management information of a new clip is added to the MIF according to the start of the recording of a new moving image file. The term "clip" means a series of moving image frames that is recorded in response to a single recording starting instruction issued by the user. For example, information of the number of frames of each moving image file is recorded as clip information. In the present embodiment, a predetermined value, for example, 0, which is the number of frames of a moving image file, is recorded as the management information in response to an instruction to start recording. The predetermined value is updated with a number of frames of a moving image data that is stored in a relevant moving image file when recording is stopped normally in response to an instruction to stop recording.

FIG. 4 is a flow chart for illustrating moving image recording processing that is executed in the recording apparatus according to the present embodiment. The moving image recording processing illustrated in FIG. 4 is executed by the main control unit 101 by controlling relevant components.

The moving image recording processing illustrated in FIG. 4 is started when an instruction from the operation unit 106 to start recording is received in the recording standby state.

First, the management information analyzing unit 103 of the main control unit 101 checks the management file 301 recorded on the recording medium 114 to detect a file that needs to be repaired, i.e., a moving image file that needs to repaired (Step S401). Specifically, the management information analyzing unit 103 checks the number of frames of each moving image file that is recorded in the management file 301 and detects, as a moving image file that needs to be repaired, a moving image file for which a predetermined value is recorded as the number of frames. The management information analyzing unit 103 notifies the number of moving image files that need to be repaired to the free capacity determining unit 102.

The free capacity determining unit 102 of the main control unit 101 determines a predetermined capacity that is used as a threshold for stopping the recording of a moving image due to a shortage of free capacity of the recording medium 114, based on the number of moving image files that need to be repaired that has been detected by the management information analyzing unit 103 (Step S402). In the present embodiment, the recording of moving image data is stopped automatically as described later when the free capacity of the recording medium 114 drops to the predetermined capacity or less during the recording of a moving image. Then, in the present embodiment, necessary pieces of data such as index tables (ITs), namely, offset information are recorded on the recording medium 114 to generate a moving image file in a reproducible format as described later.

Before the recording of a moving image is started, the free capacity determining unit 102 determines the free capacity of the recording medium 114 in order to automatically stop the recording of moving image data. The free capacity determining unit 102 first obtains the maximum data amount of moving image data that is stored in the memory 112 before recorded on the recording medium 114, an upper limit size of index tables in a single moving image file, and the total upper limit size of data added to the management file 301. The free capacity determining unit 102 further obtains the product of multiplying the number of files that need to be repaired by the upper limit size of the index tables (offset information). The sum of this product and the total upper limit size of the added data is determined as a free capacity (predetermined capacity) of the recording medium 114 that is used as a threshold for stopping the recording of moving image data automatically. The size of offset information is in proportion to the length of recording time of moving image data stored in a single file. In the present embodiment, an upper limit is set in advance to the length of recording time of moving image data that is stored in a single file and, each time the length of recording time of moving image data stored in a file that is being recorded reaches the upper limit, the moving image file that is being recorded is closed and a new moving image file is created to continue recording.

The main control unit 101 next starts moving image data compression processing which is executed by the signal processing unit 110, and instructs the recording medium control unit 113 to start the recording of the moving image (Step S403). The recording medium control unit 113 records moving image data on the recording medium 114 in accordance with the file format illustrated in FIG. 2B. When the recording of moving image data is started, the recording control unit 104 of the main control unit 101 generates offset information of each edit unit in FIG. 2B based on information about the post-compression data amount of the moving image data compressed by the signal processing unit 110, and stores the offset information in the memory 112.

Next, the free capacity determining unit 102 of the main control unit 101 regularly detects the free capacity of the recording medium 114 and determines whether or not the detected free capacity is equal to or less than the predetermined capacity determined in Step S402 (Step S404). When determining that the free capacity is equal to or less than the predetermined capacity ("YES" in Step S404), the free capacity determining unit 102 notifies the recording control unit 104 of the fact. The recording control unit 104 in this case instructs the recording medium control unit 113 to stop recording, and executes recording ending processing (Step S406).

The recording ending processing that is executed in the recording apparatus according to the present embodiment is described with reference to FIG. 5A to FIG. 5D. FIG. 5A to FIG. 5D are diagrams for illustrating the recording ending processing that is executed in the recording apparatus according to the present embodiment.

Figures 5A, 5B, 5C, 5D:
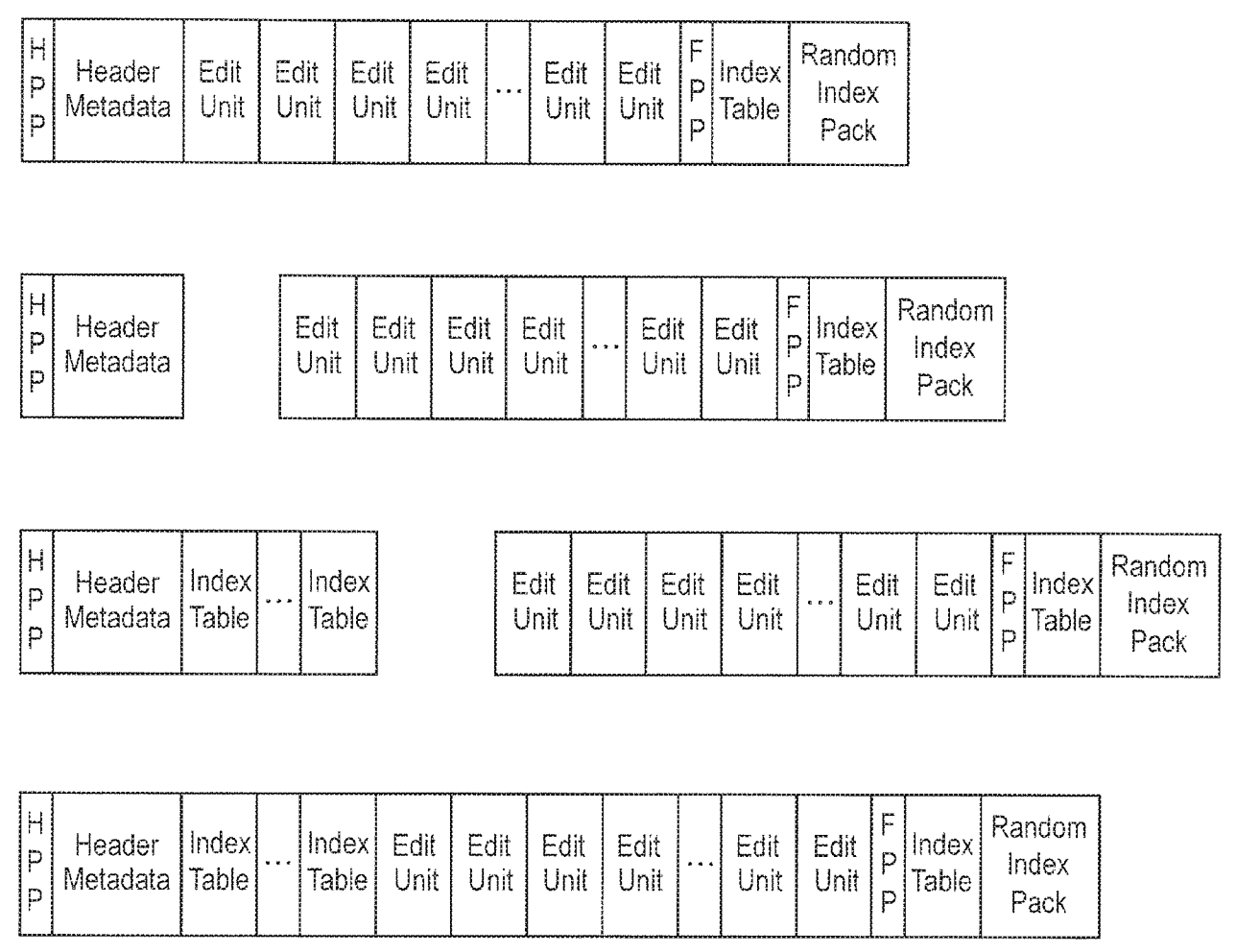

To end recording, the recording control unit 104 first creates in the recording medium 114 a file in which no index table (IT) is recorded in the file header as illustrated in FIG. 5A.

Next, the recording control unit 104 divides the file at the tail end of the header metadata as illustrated in FIG. 5B. The recording control unit 104 also reads offset information out of the memory 112.

The recording control unit 104 then records index tables (ITs), which indicate offset information, sequentially in a space between the tail end of the header metadata and the top edit unit (EU) as illustrated in FIG. 5C. Here, one index table (IT) indicates the offset information of, for example, an edit unit (EU) of ten seconds of moving image data.

After recording all index tables (ITs), the recording control unit 104 connects the rear end of the chain of index tables (ITs) to the top of the edit unit (EU) as illustrated in FIG. 5D to generate one MXF file. The recording control unit 104 records the thus generated MXF file on the recording medium 114.

In the recording ending processing, the recording control unit 104 stores index tables (ITs) in an MXF file as illustrated in FIG. 5D by changing the FAT. Specifically, the recording control unit 104 records in free areas of the recording medium 114 index tables (ITs) that contain offset information read out from the memory 112. The recording control unit 104 then updates the FAT so that the tail-end cluster of the head meta data is connected to the top cluster of the index tables (ITs), and so that the tail-end cluster of the index tables is connected to the top cluster of edit units.

When it is determined in Step S404 that the free capacity of the recording medium 114 is not equal to or less than the predetermined capacity ("NO" in Step S404), the recording control unit 104 determines whether or not an instruction to stop recording has been received from the operation unit 106 (Step S405). In the case where an instruction to stop recording has not been received from the operation unit 106 ("NO" in Step S405), the recording is continued without modifications. On the other hand, in the case where an instruction to stop recording has been received from the operation unit 106 ("YES" in Step S405), the recording control unit 104 executes the recording ending processing (Step S406).

The recording of moving image data by the recording control unit 104 is stopped in the case where power is cut off during the moving image recording processing, and index tables (ITs) are consequently not recorded on the recording medium 114. The number of frames of a relevant moving image file that is recorded in the management file 301 remains 0 as well. In the present embodiment, however, the FAT recorded on the recording medium 114 is updated by the recording control unit 104 each time moving image data is recorded on the recording medium 114 in a predetermined amount that is the unit of a single write. Accordingly, in the present embodiment, in the case where power is cut off during the moving image recording processing, moving image data that has been recorded on the recording medium 114 since the issuance of a recording starting instruction till the last update of the FAT prior to the cutting off of power can be read out from the recording medium 114.

Figure 6:
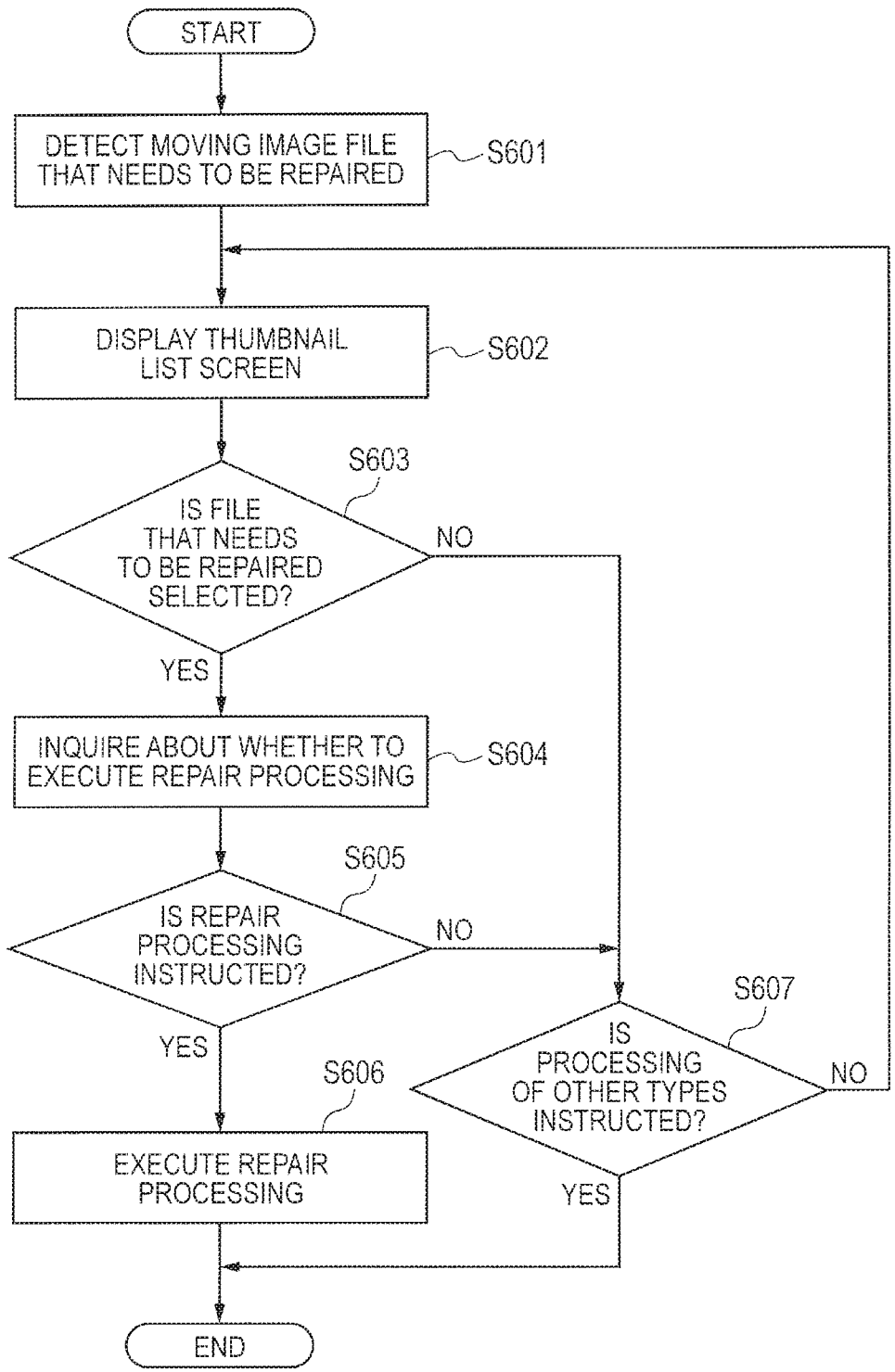
FIG. 6 is a flow chart for illustrating file repair processing that is executed in the recording apparatus according to the embodiment.

File repair processing that is executed in the recording apparatus according to the present embodiment is described next. FIG. 6 is a flow chart for illustrating the file repair processing that is executed in the recording apparatus according to the present embodiment. The processing illustrated in FIG. 6 is started when the user issues an instruction to switch to a reproduction mode by operating the operation unit 106.

First, the management information analyzing unit 103 of the main control unit 101 checks the management file 301 recorded on the recording medium 114 to detect moving image files that need to be repaired (Step S601). As described, the management information analyzing unit 103 checks the number of frames of each moving image file that is recorded in the management file 301 and detects, as a moving image file that needs to be repaired, a moving image file for which a predetermined value is recorded as the number of frames.

The main control unit 101 next displays on the display unit 107 a thumbnail image of each moving image file recorded on the recording medium 114, namely, a thumbnail list (Step S602). In the present embodiment, the main control unit 101 controls the recording medium control unit 113 to read a head portion of moving image data stored in each moving image file, and uses the signal processing unit 110 to decode a top screen. The signal processing unit 110 reduces the expanded top screen and transmits the reduced screen to the display control unit 108. For a moving image file that needs to be repaired, the main control unit 101 instructs the display control unit 108 to display a predetermined image for informing the user that the moving image file requires repair, instead of displaying a reduced image of the top screen of the moving image file.

The display control unit 108 displays on the display unit 107 a thumbnail screen, which includes a reduced image (thumbnail image) of the top screen of each moving image file and the predetermined image corresponding to a moving image file that needs to be repaired.

Figure 7:
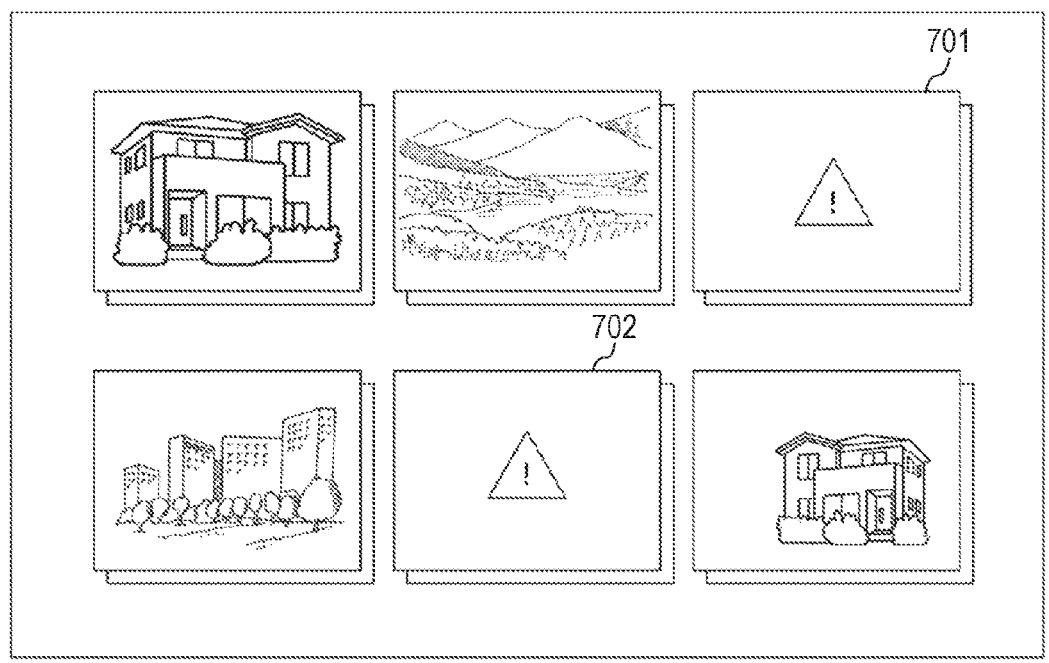
FIG. 7 is a diagram for illustrating a thumbnail screen.

FIG. 7 is a diagram for illustrating the thumbnail screen. Predetermined images 701 and 702, which correspond to moving image files that need to be repaired, are displayed as illustrated in FIG. 7. The user can select one of the displayed thumbnail images by operating the operation unit 106. The user issues an instruction to reproduce a selected moving image by instructing to start reproducing with one of other thumbnail images than the predetermined images 701 and 702 selected.

With the thumbnail screen displayed, the main control unit 101 determines whether or not the moving image file selected by the user is a moving image file that needs to be repaired (Step S603). In the case where the predetermined thumbnail image 701 or 702 is selected in FIG. 7 ("YES" in Step S603), the main control unit 101 determines that the selected moving image file is a moving image file that needs to be repaired. In the case where there is selected a thumbnail image of a moving image file other than the moving image file that needs to be repaired ("NO" in Step S603), the main control unit 101 determines whether or not an instruction to execute other types of processing, such as an instruction to play or an instruction to switch to a recording mode has been issued (Step S607). In the case where an instruction to execute relevant other types of processing has been issued ("YES" in Step S607), the main control unit 101 executes the instructed processing. In the case where an instruction to execute relevant other types of processing has not been issued ("NO" in Step S607), the main control unit 101 returns to Step S602.

When the moving image file selected by the user is a moving image file that needs to be repaired ("YES" in Step S603), the main control unit 101 displays on the display unit 107 a screen for making an inquiry to the user about whether or not the repair processing is to be executed (Step S604). The user gives an instruction about whether or not the repair processing is to be executed by operating the operation unit 106 (Step S605). In the case where the user instructs to execute the repair processing ("YES" in Step S605), the main control unit 101 uses the repair processing unit 105 to execute the repair processing (Step S606). In the case where the user does not instruct to execute the repair processing ("NO" in Step S605), the main control unit 101 proceeds to Step S607.

When an instruction to execute the repair processing is issued, the repair processing unit 105 first detects a tail end portion of the selected file and deletes an edit unit (EU) that is being recorded at the time recording is stopped due to momentary interruption or the like. The repair processing unit 105 next reads moving image data stored in the file body, starting from the top, and detects, for each edit unit (EU), a frame location (an elapsed time) and an offset that are measured from the head of the moving image. Index tables (ITs) are generated based on the detected frame location and offset, and are stored in the file header of the moving image file that needs to be repaired. The repair processing unit 105 further creates the footer partition pack (FPP), adds the FPP to the file to be repaired, and ends the repair processing of the file. When the file repair processing is completed, the recording control unit 104 detects the number of frames of the repaired moving image file, and updates information of a number of frames that has been recorded in the management file 301 with the detected number of frames.

The recording apparatus in the present embodiment thus asks the user about whether or not the repair processing is to be performed on a moving image file that needs to be repaired and that is recorded on the recording medium 114, instead of automatically executing the repair processing. The recording apparatus does not proceed to the repair processing in the case where the user does not instruct to execute the repair processing. In the case where the user issues a recording instruction when there is a moving image file that needs to be repaired among files recorded on the recording medium 114, the recording apparatus newly records moving image data. The recording apparatus according to the present embodiment is thus capable of recording a moving image at any time, including the time when there is a moving image file that needs to be repaired among files recorded on the recording medium 114. To record a new moving image file on the recording medium 114 where a moving image file that needs to be repaired is already recorded, the recording apparatus determines a free capacity of the recording medium 114 that is used as a threshold for automatically stopping the recording of moving image data during recording, in short, the predetermined capacity. The predetermined capacity is determined based on a free capacity necessary to record an index table (offset information) that is generated in the repair processing. When the free capacity of the recording medium 114 drops to the predetermined capacity or less during moving image recording, the recording is automatically stopped. This prevents a situation where the recording apparatus is unable to comply with a file repair instruction that is issued by the user after moving image recording is stopped because no free capacity is left in the recording medium 114 to record offset information. The recording apparatus according to the present embodiment is therefore capable of repairing a file without fail. In conclusion, a recording apparatus that is capable of recording a moving image at any time without causing significantly adverse effects is provided according to the present embodiment. The present embodiment also prevents a failure to repair a moving image file that results from the lack of a free capacity necessary for repair when a moving image is recorded on a recording medium where a moving image file that needs to be repaired has been recorded.

[Modified Embodiment]

The present invention is not limited to the embodiment described above, and various modifications can be made.

Examples of the modifications are described. The description of the embodiment given above takes as an example a case where the predetermined free capacity is determined based on the product of multiplying the number of moving image files that need to be repaired by the upper limit size of index tables (ITs) (offset information). However, the capacity secured by this method for the recording of index tables (ITs) is larger than necessary in the case where the length of recording of a moving image file that needs to be repaired is short. To avoid this, the size of offset information in each file may be obtained based on the file size of a moving image file that needs to be repaired. For example, the length of the recording time of moving image data is calculated based on the file size of the moving image file and an average data rate after the compression of the moving image data to obtain the size of offset information based on the calculated length of recording time. In the case where the recording apparatus is configured so that the user can set a rate selected from a plurality of target rates as the post-compression data rate of the moving image data, the length of recording time may be calculated based on the lowest data rate and the file size to determine the size of offset information based on the calculated length of recording time.

The description of the embodiment given above takes as an example a case where data recorded on the recording medium 114 is moving image data. However, data recorded on the recording medium 114 is not limited to moving image data. The present invention is applicable to a wide range of cases where pieces of sequentially obtained data such as voice data are recorded on the recording medium 114 in order and some free capacity is required to repair a file.

The description of the embodiment given above takes as an example a case where the recording apparatus 100 includes the image pickup unit 109. However, the recording apparatus 100 may not include the image pickup unit 109. For example, moving image data or the like output from an external image pickup apparatus may be input to the recording apparatus 100, or the recording apparatus 100 may receive moving image data or the like transmitted from an external transmission apparatus. The present invention is applicable to a wide range of cases where pieces of sequentially obtained data are recorded on the recording medium 114 in order.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope or the following claims is to be accorded the broadest interpretation so as to encompass all such modifications and equivalent structures and functions.

This application claims the benefit of Japanese Patent Application No. 2015-066816, filed Mar. 27, 2015, which is hereby incorporated by reference herein in its entirety.

What is claimed is:

1. A recording apparatus comprising:
a recording unit that records on a recording medium a file that includes moving image data and offset information indicating an offset of the moving image data included in the file,
wherein normal offset information is recorded in the file if recording of the moving image data is stopped normally;
a control unit that controls the recording unit so that recording of the moving image data is stopped in response to a drop of a free capacity of the recording medium to a predetermined capacity during recording of the moving image data, wherein the control unit detects a predetermined file that needs to be repaired among the files which have been recorded on the recording medium,
wherein the predetermined file does not have normal offset information;
a repair unit that executes repair processing for the predetermined file which has been recorded on the recording medium,
wherein the repair unit, in the repair processing, generates normal offset information for the predetermined file and stores the generated normal offset information in the predetermined file which has been recorded on the recording medium, and
wherein the control unit decides the predetermined capacity based on a data amount necessary to record the normal offset information for the detected predetermined file if the moving image data is recorded on the recording medium on which the predetermined file has been recorded and controls the recording unit so that the recording of the moving image data is stopped in response to a drop of the free capacity of the recording medium on which the predetermined file has been recorded to the decided predetermined capacity during the recording of the moving image data on the recording medium on which the predetermined file has been recorded.

2. The recording apparatus according to claim 1, wherein the control unit controls the repair unit so that the repair processing is executed in accordance with an instruction from a user to execute the repair processing.

3. The recording apparatus according to claim 1,
wherein the control unit decides the predetermined capacity based on a data amount of the normal offset information that is generated in the repair processing.

4. The recording apparatus according to claim 3, wherein the control unit detects a number of predetermined files recorded on the recording medium, and decides the predetermined capacity based on the detected number of predetermined files and the data amount of the normal offset information that is generated for he detected predetermined files in the repair processing.

5. The recording apparatus according to claim 1, wherein, if files recorded on the recording medium include a plurality of predetermined files, the control unit decides the predetermined capacity based on a total data amount necessary to record the normal offset information for the plurality of predetermined files.

6. The recording apparatus according to claim 1, wherein the control unit calculates a data amount necessary to record the normal offset information for the predetermined file based on a recording time of the predetermined file.

7. The recording apparatus according to claim 6, wherein the control unit obtains the length of the recording time based on a file size of the predetermined file.

8. The recording apparatus according to claim 1, wherein the control unit generates management information of a file recorded on the recording medium, controls the recording unit so that the management information is recorded on the recording medium, and detects the predetermined file based on the management information that is recorded on the recording medium.

9. The recording apparatus according to claim 8, wherein tine control unit stores, in the management information, information about a number of frames of the moving image data that is included in the file, controls the recording unit so that a predetermined value is recorded as information about the number of frames in response to start of recording of the moving image data, detects, in response to an instruction to stop recording the moving image data, the number of frames of the moving image data whose recording is stopped by the instruction to stop recording the moving image data, and updates the information about the number of frames in the management information that has been recorded in the recording medium with the detected number of frames.

10. The recording apparatus according to claim 1, further comprising an image pickup unit,
wherein the recording unit records moving image data output from the image pickup unit on the recording medium.

11. A method of controlling a recording apparatus, comprising:
detecting a predetermined file that needs to be repaired among files which have been recorded on a recording medium, wherein the predetermined file does not have normal offset information;
deciding a predetermined capacity based on a data amount necessary to record the normal offset information for the detected predetermined a file if roving image data is recorded on the recording medium on which the predetermined file has been recorded;
sequentially recording the moving image data on the recording medium; and
stopping recording of the moving image data in response to a drop of a free capacity of the recording medium on which the predetermined file has been recorded to the decided predetermined capacity during the recording of the moving image data on the recording medium on which the predetermined file has been recorded;
executing repair processing for the predetermined file which has been recorded on the recording medium, wherein in the repair processing, the normal offset information for the predetermined file is generated, and the generated normal offset information is stored in the predetermined file which has been recorded on the recording medium.

* * * * *